United States Patent
Nagaraja et al.

(10) Patent No.: US 9,438,439 B2
(45) Date of Patent: Sep. 6, 2016

(54) DYNAMIC OPTIMIZATION OF ADVERTISEMENT PACKETS

(71) Applicant: Aruba Networks Inc., Sunnyvale, CA (US)

(72) Inventors: Harsha Nagaraja, Bangalore (IN); Shishir Verma, Bangalore (IN); Sridhar Chandrashekhar, Bangalore (IN); Vedamurthy Joshi, Bangalore (IN)

(73) Assignee: Aruba Networks, Inc., Sunnyvale, CA (US)

( * ) Notice: Subject to any disclaimer, the term of this patent is extended or adjusted under 35 U.S.C. 154(b) by 182 days.

(21) Appl. No.: 14/067,867

(22) Filed: Oct. 30, 2013

(65) Prior Publication Data

US 2015/0117215 A1    Apr. 30, 2015

(51) Int. Cl.
| | |
|---|---|
| *H04L 12/28* | (2006.01) |
| *H04L 12/26* | (2006.01) |
| *H04L 12/18* | (2006.01) |
| *H04L 12/66* | (2006.01) |
| *H04L 12/801* | (2013.01) |

(52) U.S. Cl.
CPC ......... *H04L 12/1895* (2013.01); *H04L 12/185* (2013.01); *H04L 47/10* (2013.01)

(58) Field of Classification Search
CPC ........... H04L 63/1458; H04L 63/1441; H04L 63/14; H04L 63/12; H04L 45/02; H04L 45/03; H04L 45/021; H04L 45/023; H04L 45/025; H04L 45/026; H04L 45/028; G06F 15/173; G06F 15/16
USPC .................................. 709/224, 242, 237
See application file for complete search history.

(56) References Cited

U.S. PATENT DOCUMENTS

| | | | |
|---|---|---|---|
| 8,243,594 B1* | 8/2012 | Fotedar | H04L 45/245 370/229 |
| 8,693,314 B1* | 4/2014 | Horton | H04L 1/22 370/216 |
| 8,948,168 B2* | 2/2015 | Tatsumi | H04L 49/15 370/256 |
| 2003/0037136 A1* | 2/2003 | Labovitz et al. | 709/224 |
| 2004/0083306 A1* | 4/2004 | Gloe | 709/245 |
| 2005/0073963 A1* | 4/2005 | Goodfellow | H04L 45/12 370/255 |
| 2005/0149407 A1* | 7/2005 | Kamiwada | G06Q 30/0277 705/14.73 |
| 2006/0056311 A1* | 3/2006 | Han et al. | 370/252 |
| 2006/0133282 A1* | 6/2006 | Ramasamy | H04L 45/00 370/238 |
| 2006/0221866 A1* | 10/2006 | Shepherd | H04L 45/16 370/255 |
| 2007/0047464 A1* | 3/2007 | Guingo | H04L 12/24 370/254 |
| 2007/0115844 A1* | 5/2007 | Basu | H04L 67/16 370/252 |
| 2007/0130427 A1* | 6/2007 | Lahti | H04L 49/90 711/133 |
| 2007/0180483 A1* | 8/2007 | Popoviciu | H04L 12/2801 725/111 |
| 2007/0232221 A1* | 10/2007 | Miyata | H04H 60/42 455/3.01 |
| 2008/0095053 A1 | 4/2008 | Chen et al. | |

(Continued)

*Primary Examiner* — Wutchung Chu (57) ABSTRACT

In general, in one aspect, embodiments relate to a non-transitory computer readable medium comprising instructions that, when executed by a processor, perform a method. The method includes receiving, by a controller, a first plurality of multicast advertisement packets from a first networking device on an external network, wherein the plurality of multicast advertisement packets are received at a first frequency, storing, by the controller, one of the first plurality of multicast advertisement packets in an advertisement packet repository, and transmitting, by the controller, information in the one of the plurality of advertisement packets on an internal network at a second frequency, wherein the second frequency is less frequent than the first frequency.

18 Claims, 9 Drawing Sheets

(56) References Cited

U.S. PATENT DOCUMENTS

| | | | |
|---|---|---|---|
| 2009/0024758 A1* | 1/2009 | Levy-Abegnoli | H04L 45/745 709/237 |
| 2010/0010900 A1* | 1/2010 | Lee | G06Q 30/02 705/14.69 |
| 2010/0322131 A1* | 12/2010 | Song et al. | 370/312 |
| 2011/0103284 A1* | 5/2011 | Gundavelli et al. | 370/312 |
| 2011/0299391 A1* | 12/2011 | Vobbilisetty | H04L 45/586 370/230.1 |
| 2011/0310864 A1* | 12/2011 | Gage | H04L 45/02 370/338 |
| 2012/0236859 A1* | 9/2012 | Subramanian | H04L 45/245 370/392 |
| 2014/0282864 A1* | 9/2014 | Thubert et al. | 726/3 |
| 2015/0282206 A1* | 10/2015 | Kalhan | H04W 72/1278 370/330 |

* cited by examiner

DYNAMIC OPTIMIZATION OF ADVERTISEMENT PACKETS

BACKGROUND

Networks have a finite amount of bandwidth. As more data is transmitted over a network, transfer rates slow down and services may become unreliable. Therefore, it is advantageous to reduce the amount of unnecessary data being sent on the network.

Some data sent on networks is sent using multicast packets. Multicast packets are data segments sent to all devices on a network regardless of which devices want the data. However, networking devices that do not want the data or previously received the data simply ignore the multicast packet.

OVERVIEW

In general, in one aspect, embodiments relate to a non-transitory computer readable medium comprising instructions that, when executed by a processor, perform a method. The method includes receiving, by a controller, a first plurality of multicast advertisement packets from a first networking device on an external network, wherein the plurality of multicast advertisement packets are received at a first frequency, storing, by the controller, one of the first plurality of multicast advertisement packets in an advertisement packet repository, and transmitting, by the controller, information in the one of the plurality of advertisement packets on an internal network at a second frequency, wherein the second frequency is less frequent than the first frequency.

In general, in one aspect, embodiments relate to a system that includes an advertisement packet repository, a controller, and a transmission engine. The controller is communicatively coupled to an external network and an internal network, and is configured to receive a first plurality of multicast advertisement packets from a first networking device on the external network, wherein the plurality of multicast advertisement packets are received at a first frequency; and store one of the first plurality of multicast advertisement packets in the advertisement packet repository. The transmission engine is configured to transmit information in the one of the first multicast advertisement packet on the internal network at a second frequency, wherein the second frequency is less frequent than the first frequency.

In general, in one aspect, embodiments relate to a non-transitory computer readable medium comprising instructions that, when executed by a processor, perform a method. The method includes receiving, by a controller, a plurality of multicast advertisement packets from a networking device on an external network, storing, by the controller, one of the plurality of multicast advertisement packets in an advertisement packet repository, converting, by the controller, the one of the plurality of multicast advertisement packets into a unicast advertisement packet, and transmitting, by the controller, the unicast advertisement packet to an endpoint system on an internal network.

In general, in one aspect, embodiments relate to a system that includes an advertisement packet repository, a controller, and a transmission engine. The controller is communicatively coupled to an external network and an internal network, and is configured to receive a plurality of multicast advertisement packets from a networking device on the external network, store one of the plurality of multicast advertisement packets in the advertisement packet repository, and convert the one of the plurality of multicast advertisement packets into a unicast advertisement packet. The transmission engine is configured to transmit the unicast advertisement packet to an endpoint system on the internal network.

Other aspects will be apparent from the following description and the appended claims.

DETAILED DESCRIPTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

In general, embodiments provide a method and system for maintaining the consistency of a network while reducing multicast floods. Specifically, embodiments may be used to maintain copies of multicast packets from one network and control the transmission of the multicast packets on a second network.

Figure 1:
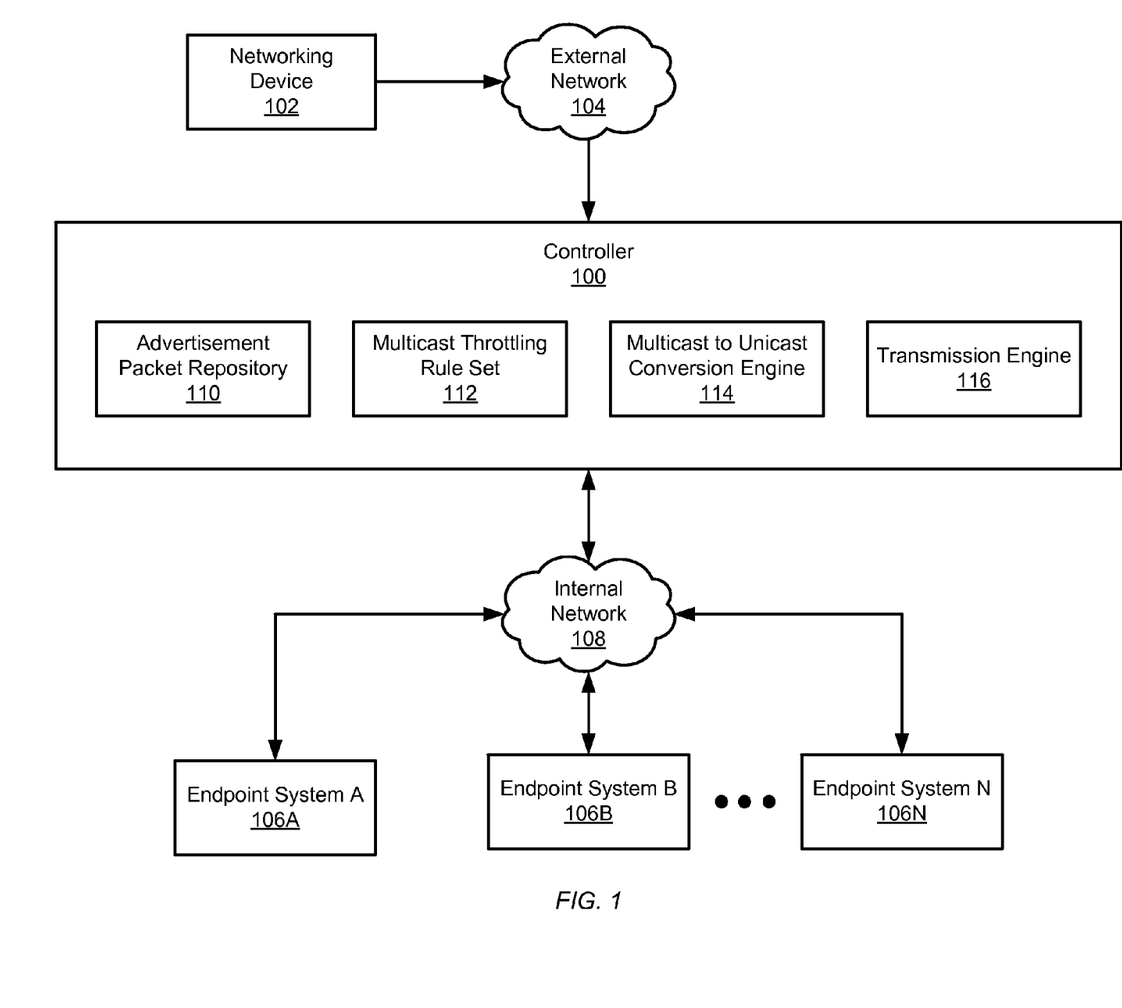
FIG. 1 shows a system in accordance with one or more embodiments.

FIG. 1 shows a diagram of a system in accordance with one or more embodiments. As shown in FIG. 1, the system includes a controller (100) operatively connected to a networking device (102) via external network (104). The controller (100) is also connected to number of endpoint systems (endpoint system A (106A), endpoint system B (106B), endpoint system N (106N)) via an internal network (108). The controller (100) includes an advertisement packet repository (110), a multicast throttling rule set (112), a multicast to unicast conversion engine (114), and a transmission engine (116).

In one or more embodiments, the networking device (102) is a computing system with functionality to communicate over an external network (104). The networking device (102) may further include functionality to facilitate communication between other devices communicatively coupled to the external network (104), including controller (100), as well as devices communicatively coupled to the internal network (108) such as the endpoint systems (endpoint system A (106A), endpoint system B (106B), endpoint system N (106N)).

In one or more embodiments, the networking device (102) communicates, in part, using advertisement packets. In one or more embodiments, advertisement packets sent by the networking device (102) advertise the network location and configuration of the networking device (102). In one or more embodiments, the network location and configuration stored in the advertisement packet may be in the form of an advertised prefix and lifetime that is used by endpoint systems (endpoint system A (106A), endpoint system B (106B), endpoint system N (106N)) to derive configuration information. In one or more embodiments, the advertisement packet may include a set of internet protocol address ranges reachable via the networking device (102). Examples of advertisement packets include router advertisement (RA) packets, which may include an advertised prefix that an endpoint system (endpoint system A (106A), endpoint system B (106B), endpoint system N (106N)) may use to derive a global internet protocol (IP) address and a default gateway address of the router.

In one or more embodiments, advertisement packets are transmitted as multicast packets. In one or more embodiments, a multicast packet is a datagram addressed to a class of devices on a network (for example, external network (104), internal network (108)). In one or more embodiments, the controller (100) includes functionality to send a copy of each multicast packet received to all devices attached to the internal network (108) that match the targeted class of devices specified in the multicast packet. Multicast packets may be sent to all devices attached to the internal network (108) (in other words, a broadcast packet) or a subset of devices that have joined the corresponding multicast group.

In one or more embodiments, the external network (104) and the internal network (108) are networks of computing systems. In one or more embodiments, some or all data transmitted between the external network (104) and the internal network (108) passes through the controller (100). In one or more embodiments, the external network (104) is a network that includes the networking device (102) and the controller (100), and excludes the endpoint systems (endpoint system A (106A), endpoint system B (106B), endpoint system N (106N)). In one or more embodiments, the internal network (108) is a network that includes the controller (100) and endpoint systems (endpoint system A (106A), endpoint system B (106B), endpoint system N (106N)), and excludes the networking device (102).

In one or more embodiments, the controller (100) is a combination of hardware and software with functionality to facilitate communication between an external network (104) and an internal network (108). Specifically, the controller (100) is a network device that includes functionality to provide and control access to various endpoint systems, mediate network communications between endpoint systems, and monitor the network traffic. In one or more embodiments, the controller (100) is a network device that controls the configuration of one or more access points. In one or more embodiments, an access point is a network device that includes functionality to provide network access (for example, via a router) to one or more endpoint systems (for example, endpoint system A (106A), endpoint system B (106B), endpoint system N (106N)).

In one or more embodiments, the controller (100) has exclusive or shared control over the data transmitted from the external network (104) (including data transmitted from the networking device (102)) to the internal network (108) (include data targeting the endpoint systems (endpoint system A (106A), endpoint system B (106B), endpoint system N (106N)). Although described as a controller, controller (100) may be implemented as another type of network device with appropriate functionality. For instance, controller (100) may be implemented as an access point.

In one or more embodiments, the advertisement packet repository (110) includes functionality to store advertisement packets sent by the networking device (102). In one or more embodiments, the controller (100) stores advertisement packets sent by the networking device (102) targeting the endpoint systems (endpoint system A (106A), endpoint system B (106B), endpoint system N (106N)) attached to the controller (100) via the internal network (108). In one or more embodiments, the first instance of an advertisement packet received by the controller (100) is stored in the advertisement packet repository (110) and not immediately retransmitted to the endpoint systems (endpoint system A (106A), endpoint system B (106B), endpoint system N (106N)). All subsequent copies of the advertisement packet may be ignored by the controller (100) or used to update attributes of the advertisement packet.

In one or more embodiments, the advertisement packet repository (110) includes functionality to store attributes for the received advertisement packets. In one or more embodiments, attributes for an advertisement packet include details extracted from the advertisement packet such as source address, destination address (in other words, target address), and type of issuing device. In one or more embodiments, attributes for an advertisement packet also include information gathered by receiving more than one copy of the advertisement packet such as the transmission frequency of the advertisement packet (in other words, the rate at which copies of the advertisement packet are received by the controller (100)). As used herein, the term frequency refers to the rate at which packets are received or transmitted. In one or more embodiments, the frequency of receiving advertisement packets from a networking device (such as a router) may be less than 20 seconds (for example, one packet every four seconds) while the frequency of transmitting the information from the advertisement packets may be 60 seconds or longer.

In one or more embodiments, the advertisement packets stored in the advertisement packet repository (110) are used to validate subsequently received advertisement packets. In one or more embodiments, the validity of each advertisement packet may be determined by comparing the newly received advertisement packet to other advertisement packets stored in the advertisement packet repository (110). In one or more embodiments, an attacking device may send an advertisement packet to the controller (100) that appears to have been sent from a different networking device (for example, networking device (102)). The advertisement packet sent from the attacking device may instruct endpoint systems (endpoint system A (106A), endpoint system B (106B), endpoint system N (106N)) to alter a parameter associated with the networking device (for example, networking device (102)) that would negatively affect network traffic. The attributes of such nefarious advertisement packets may match some attributes of the previously received advertisement packet (for example, a source address that indicates it was sent by the same networking device), but may differ from other attributes (for example, a new gateway address for network traffic). The changed attributes may be an attempt to disrupt network service, such as having clients reroute network traffic to a different gateway. In one or more embodiments, the validation by the controller (100) prevents denial of service attacks by ensuring that no nefarious device is spoofing the advertisement packets or changing the attributes of advertisement packets to divert traffic to the nefarious device. Validation of advertisement packets is discussed in detail in FIG. 5.

In one or more embodiments, the multicast throttling rule set (112) is a collection of instructions that dictate the manner in which the stored advertisement packets are to be transmitted to the endpoint systems (endpoint system A (106A), endpoint system B (106B), endpoint system N (106N)) over the internal network. In one or more embodiments, network traffic between the controller (100) and the endpoint systems (endpoint system A (106A), endpoint system B (106B), endpoint system N (106N)) may be decreased by retransmitting each advertisement packet to the endpoint systems (endpoint system A (106A), endpoint system B (106B), endpoint system N (106N)) at a reduced frequency. Specifically, the controller (100) may issue a stored advertisement packet to the endpoint systems (endpoint system A (106A), endpoint system B (106B), endpoint system N (106N)) at a frequency befitting the structure and/or the condition of the internal network (108). In one or more embodiments, the controller (100) uses the multicast throttling rule set (112) to determine a new frequency at which to issue the advertisement packets to the endpoint systems (endpoint system A (106A), endpoint system B (106B), endpoint system N (106N)). The advertisement packets may then be issued to the endpoint systems (endpoint system A (106A), endpoint system B (106B), endpoint system N (106N)) using the transmission engine (116).

In one or more embodiments, the multicast throttling rule set (112) takes as input attributes for the advertisement packet, the current internal network traffic level, the number of endpoint systems (endpoint system A (106A), endpoint system B (106B), endpoint system N (106N)) attached to the internal network (108), and the current advertisement packet aggregate traffic level. The multicast throttling rule set (112) may provide as output a frequency (in other words, schedule) at which the advertisement packet is to be sent out. In one or more embodiments, the multicast throttling rule set (112) includes retransmission frequency policy (applied to each advertisement packet individually) and an advertisement packet aggregate traffic level policy (applied to all advertisement packets currently being transmitted on the internal network (108)). Further detail regarding the multicast throttling rule set (112) is provided in FIG. 3.

In one or more embodiments, the multicast to unicast conversion engine (114) is a process or group of processes with functionality to convert a multicast packet (or other packet) into a unicast packet. As described above, in one or more embodiments, a multicast packet is a packet addressed to a specified class of devices on a network. In contrast, in one or more embodiments, a unicast packet is a packet targeting (in other words, addressed to) a single device on a network. For example, a multicast packet may be addressed to all endpoint systems (endpoint system A (106A), endpoint system B (106B), and endpoint system N (106N)) on the internal network (108) and a unicast packet may be addressed to a single endpoint system (for example, endpoint system A (106A), endpoint system B (106B), or endpoint system N (106N)).

In one or more embodiments, endpoints (endpoint system A (106A), endpoint system B (106B), endpoint system N (106N)) send out solicitation packets requesting information about one or more devices on the network. In one or more embodiments, solicitation packets are multicast packets addressed to a class of devices on the network. Upon receiving a solicitation packet from an endpoint system (endpoint system A (106A), endpoint system B (106B), endpoint system N (106N)), the networking device (102) may immediately send out an advertisement packet (as opposed to waiting until the next scheduled transmission). In one or more embodiments, solicitation packets sent by endpoint systems (endpoint system A (106A), endpoint system B (106B), endpoint system N (106N)) contributes to the advertisement packet traffic level on the internal network (108).

In one or more embodiments, the controller (100) includes functionality to receive a solicitation packet from an endpoint system (endpoint system A (106A), endpoint system B (106B), endpoint system N (106N)) and respond with an advertisement packet stored in the advertisement packet repository (110). In one or more embodiments, the controller (100) determines whether the information requested in the solicitation packet is present in an advertisement packet stored in the advertisement packet repository (110). If an advertisement packet corresponding to the solicitation packet is stored in the advertisement packet repository (110), then the controller (100) responds to the endpoint system issuing the solicitation packet by sending a unicast version of the advertisement packet. Specifically, the controller (100) may use the multicast to unicast conversion engine (114) to convert the multicast advertisement packet stored in the advertisement packet repository (110) into a unicast advertisement packet. The unicast advertisement packet is then transmitted directly to the issuing endpoint system (endpoint system A (106A), endpoint system B (106B), endpoint system N (106N)) using the transmission engine (116) instead of sending the original multicast advertisement packet which would increase the advertisement packet traffic level on the internal network (108).

In one or more embodiments, the endpoint systems (endpoint system A (106A), endpoint system B (106B), endpoint system N (106N)) are computing devices configured to communicate over one or more networks (for example, internal network (108), external network (104)). In one or more embodiments, the endpoint systems (endpoint system A (106A), endpoint system B (106B), endpoint system N (106N)) include functionality to send out solicitation packets. In one or more embodiments, solicitation packets are requests for the network location and configuration of a type of networking device (for example, networking device (102)). Examples of solicitation packets include router solicitation (RS) packets, which request the location and configuration of a networking device that is implemented as a router.

In one or more embodiments, solicitation packets are transmitted as multicast packets addressed to a class of devices on a network (for example, external network (104), internal network (108)). In one or more embodiments, the controller (100) includes functionality to receive a solicitation packet from an endpoint (endpoint system A (106A), endpoint system B (106B), endpoint system N (106N)) and respond with a unicast version of an advertisement packet containing the information requested in the solicitation packet. The solicitation packet may be sent to all devices attached to the internal network (108) and/or the external network (102) or a subset of devices that have joined a corresponding multicast group.

Figure 2:
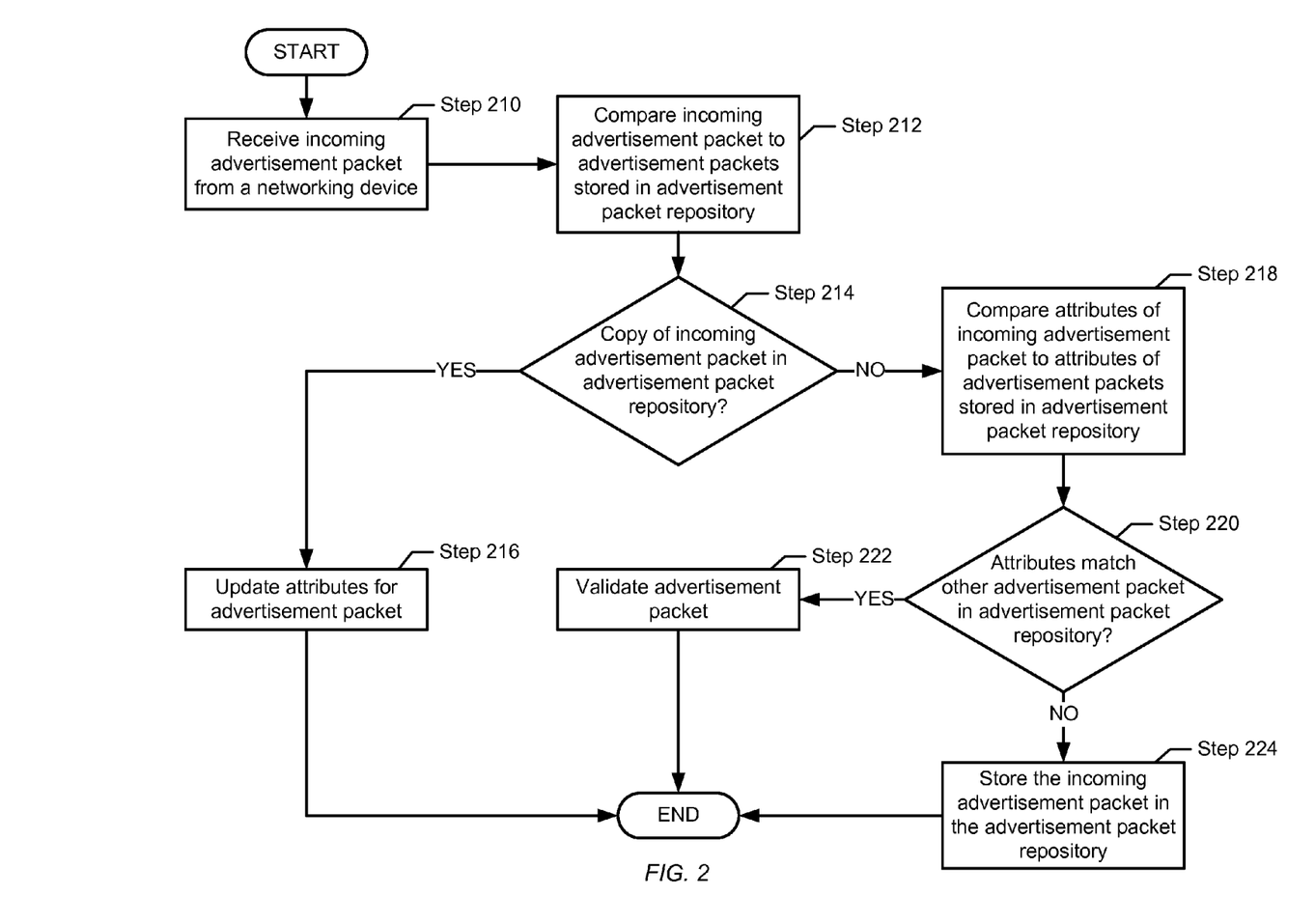
FIG. 2 shows a flow diagram in accordance with one or more embodiments.

FIG. 2 shows a flowchart for receiving an advertisement packet in accordance with one or more embodiments. While the various steps in the flowchart are presented and described sequentially, one of ordinary skill will appreciate that some or all of the steps may be executed in different orders, may be combined or omitted, and some or all of the steps may be executed in parallel.

In Step 210, the controller receives an incoming advertisement packet from a networking device. In one or more embodiments, the incoming advertisement packet is a multicast RA packet. In Step 212, the controller compares the incoming advertisement packet to the advertisement packets stored in the advertisement packet repository.

In Step 214, the controller determines whether a copy of the incoming advertisement packet (for example, an advertisement packet with fully matching attributes) already exists in the advertisement packet repository (based on the comparison in Step 212). In one or more embodiments, the determination in Step 214 includes determining whether a substantially similar or identical advertisement packet exists in the advertisement packet repository. If In Step 214, the controller determines that a copy of the incoming advertisement packet already exists in the advertisement packet repository, then in Step 216, the attributes stored with the advertisement packet in the advertisement packet repository are updated. In one or more embodiments, subsequently received (for example, after the first copy of the advertisement packet) advertisement packets are used by the controller to discern attributes of the advertisement packet not included in the advertisement packet itself. For example, the controller may discern the frequency at which the advertisement packet is being transmitted once one or more subsequent copies of the advertisement packets are received.

If In Step 214, the controller determines that a copy of the incoming advertisement packet does not exist in the advertisement packet repository, then in Step 218, the controller compares the attributes of the incoming advertisement packet to the attributes of advertisement packets stored in advertisement packet repository. In Step 220, the controller determines whether the attributes of the incoming advertisement packet match any of the attributes for the advertisement packets stored in the advertisement packet repository. In one or more embodiments, the determination in Step 220 includes determining whether one or more attributes of an advertisement packet stored in the advertisement packet repository match one or more attributes of the incoming advertisement packet. In one or more embodiments, an advertisement packet that is not a copy (for example, does not have fully matching attributes), but includes some matching attributes is an indication that the advertisement packet may have been sent as an attempt to disrupt network traffic. For example, an attacking device may generate a router advertisement packet addressed to all endpoint systems on the network that includes a source IP address matching the IP address of an authentic router on the network. The attacking device may use the router advertisement packet to change one or more settings (for example, internet protocol version 6 (IPv6) gateway, global IPv6 configuration, lifetime, etc.) associated with the authentic router in order to bring about a denial of service attack on the authentic router. In this case, the source IP address attribute of the router advertisement packet will match the source IP address of a previously received router advertisement packet from the authentic router.

If in Step 220, the controller determines that the attributes of the incoming advertisement packet match the attributes of another advertisement packet stored in the advertisement packet repository, then in Step 222, the incoming advertisement packet is validated. In one or more embodiments, matching attributes between the incoming advertisement packet and the attributes of another advertisement packet stored in the advertisement packet repository indicates a change in the network and/or an attempt to initiate an attack on the network. Further detail about Step 222 is provided in FIG. 5.

If in Step 220, the controller determines that the attributes of the incoming advertisement packet do not match the attributes of any other advertisement packet stored in the advertisement packet repository, then in Step 224, the controller stores the incoming advertisement packet in the advertisement packet repository. In one or more embodiments, once an advertisement packet is stored in the advertisement repository, it is immediately sent out on the internal network. In one or more embodiments, a transmission schedule for the advertisement packet is determined, as described below in FIG. 3.

In one or more embodiments, the first copy of an advertisement packet received may be from an attacking device. This may be addressed by the controller sending out a specially encrypted packet to a predefined or administrator-configured destination using the information in the advertisement packet (for example, using the sender of an RA packet as a router). The results of the transmission may be used to determine whether the information in the advertisement packet is legitimate (for example, whether the device sending the advertisement packet is a legitimate IPv6 router that is able to properly provide network access to users).

Figure 3:
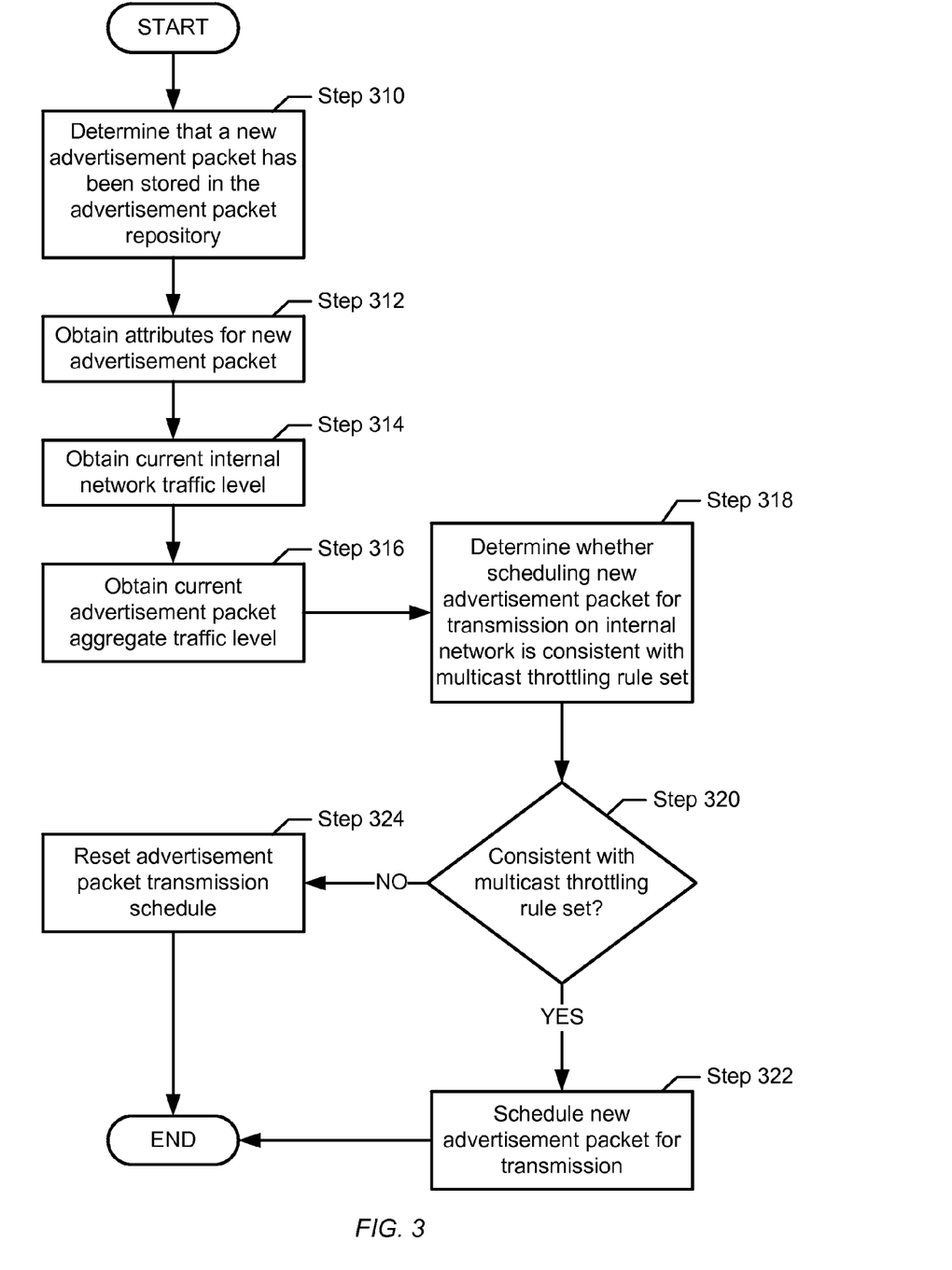
FIG. 3 shows a flow diagram in accordance with one or more embodiments.

FIG. 3 shows a flowchart for scheduling an advertisement packet for transmission on an internal network in accordance with one or more embodiments. While the various steps in the flowchart are presented and described sequentially, one of ordinary skill will appreciate that some or all of the steps may be executed in different orders, may be combined or omitted, and some or all of the steps may be executed in parallel.

In Step 310, the controller determines that a new advertisement packet has been stored in the advertisement packet repository. In one or more embodiments, Step 310 is initiated once Step 224 in FIG. 2 is completed. In Step 312, the controller obtains the attributes for the new advertisement packet. In one or more embodiments, the attributes include the source address, the destination address (in other words, class of targeted devices), type of issuing device, and frequency at which the advertisement packet has been sent out by the issuing device.

In Step 314, the controller obtains the current internal network traffic level. In one or more embodiments, the current internal network traffic level is a value measuring the amount of data being transmitted over the internal network relative to a maximum amount of data transmission that the internal network supports. In one or more embodiments, the current internal network traffic level is measured as a current bandwidth of the internal network.

In Step 316, the controller obtains the current advertisement packet aggregate traffic level. In one or more embodiments, the current advertisement packet aggregate traffic level is a value describing the amount of network traffic currently being used by the transmission of advertisement packets sent by the controller. In one or more embodiments, the current advertisement packet aggregate traffic level is a percentage of the current internal network traffic level.

In Step 318, the controller determines whether scheduling the new advertisement packet for transmission on internal network is consistent with the multicast throttling rule set. In one or more embodiments, the determination includes determining a frequency to retransmit the new advertisement packet according to the retransmission frequency policy of the multicast throttling rule set. In one or more embodiments, the determination also includes determining whether the additional transmission of the new advertisement packet over the internal network will increase the advertisement packet aggregate traffic level such that the new advertisement packet aggregate traffic level violates the advertisement packet aggregate traffic level policy of the multicast throttling rule set.

In Step 320, the controller determines whether scheduling the new advertisement packet for transmission on internal network is consistent with the multicast throttling rule set. If in Step 320, the controller determines that scheduling the new advertisement packet for transmission on internal network is consistent with the multicast throttling rule set, then in Step 322, the new advertisement packet is scheduled for transmission on the internal network.

In one or more embodiments, scheduling the new advertisement packet for transmission on the internal network includes calculating a frequency schedule based on the attributes of the advertisement packet (for example, the frequency that the advertisement packet was received from the networking device) and the retransmission frequency policy of the multicast throttling rule set.

If in Step 320, the controller determines that scheduling the new advertisement packet for transmission on internal network would not be consistent with the multicast throttling rule set, then in Step 324, the advertisement packet transmission schedule for all advertisement packets currently being transmitted on the internal network is reset. In one or more embodiments, resetting the advertisement packet transmission schedule includes changing the frequency of transmission for each advertisement packet being transmitted by the controller on the internal network. In one or more embodiments, changing the frequency of transmission for each advertisement packet includes reducing the frequency of transmission such that the advertisement packet aggregate traffic level is consistent with the advertisement packet aggregate traffic level policy of the multicast throttling rule set.

In one or more embodiments, the network device (for example, the controller described above) may include alternate or additional functionality to the processes described in FIGS. 2 and 3. In one or more embodiments, transmission by the network device may include storing one of the advertisement packets while discarding others, and sending copies of the one stored advertisement packet. In one or more embodiments, transmission by the network device may include saving the last received advertisement packet while discarding earlier router advertisements, and sending out the last received advertisement packet. In one or more embodiments, the advertisement packet is sent out once (in other words, multiple copies of the same advertisement packet are not sent out) because a new version of the advertisement packet is received before the next scheduled transmission. In one or more embodiments, the network device saves an advertisement packet and discards other advertisement packets that are identical or similar to the saved advertisement packet. In one or more embodiments, the network device replaces the saved advertisement packet in response to detecting a change in the information stored in the advertisement packets received from the same device.

Figure 4:
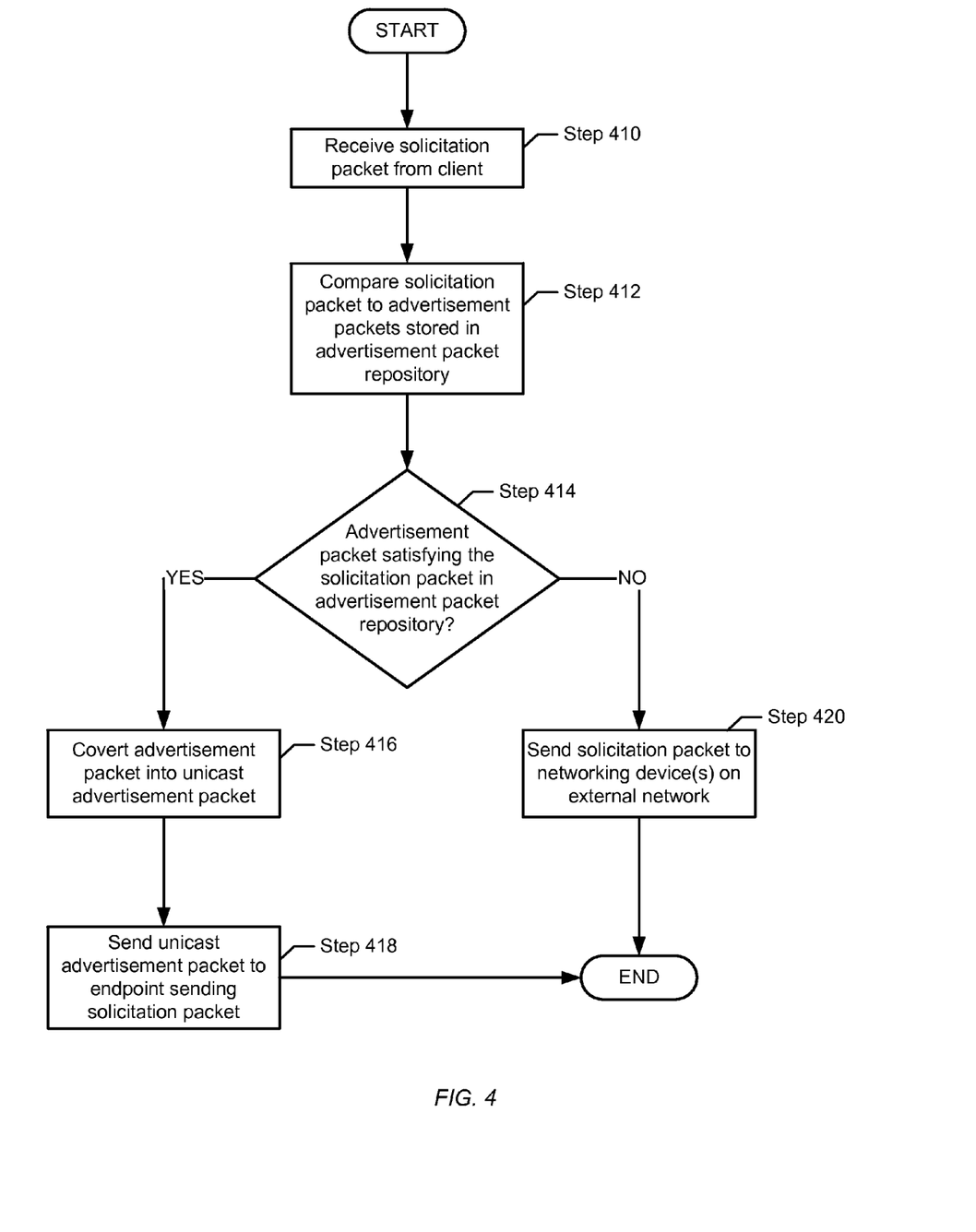
FIG. 4 shows a flow diagram in accordance with one or more embodiments.

FIG. 4 shows a flowchart for receiving a solicitation packet in accordance with one or more embodiments. While the various steps in the flowchart are presented and described sequentially, one of ordinary skill will appreciate that some or all of the steps may be executed in different orders, may be combined or omitted, and some or all of the steps may be executed in parallel.

In Step 410, the controller receives a solicitation packet from an endpoint system on the internal network. In Step 412, the controller compares the solicitation packet to the advertisement packets stored in the advertisement packet repository. In Step 414, the controller determines whether the advertisement packet repository includes at least one advertisement packet that satisfies the solicitation packet. In one or more embodiments, an advertisement packet satisfies a solicitation packet if the advertisement packet describes the configuration and network address of a type of device matching the type of device about which the solicitation packet is requesting information. For example, a solicitation packet requesting information about any routers attached to the network is satisfied by an advertisement packet for a router.

If in Step 414, the controller determines that the advertisement packet repository includes at least one advertisement packet that satisfies the solicitation packet, then in Step 416, the controller converts the advertisement packet(s) that satisfy the solicitation packet into unicast advertisement packets. In one or more embodiments, converting an advertisement packet into a unicast advertisement packet includes replacing the destination address (indicating a device class) of the advertisement packet with the network address of the endpoint that sent the solicitation packet. In Step 418, the controller sends the unicast advertisement packet to the endpoint system that sent the solicitation packet.

If in Step 414, the controller determines that the advertisement packet repository does not include at least one advertisement packet that satisfies the solicitation packet, then in Step 420, the controller forwards the solicitation packet to the networking device(s) on the external network. In one or more embodiments, the solicitation packet may then be received by a networking device that, in response to receiving the solicitation packet, will send out an advertisement packet to the external network that may be received and processed by the controller as described in FIG. 2.

In one or more embodiments, the controller refrains from sending out advertisement packets on the internal network until a solicitation packet is received. Specifically, the controller may be configured to listen for solicitation packets and send out multicast or unicast advertisement packets in response to received solicitation packets. A controller so configured may not send out any unsolicited advertisement packets on the internal network or may send out very few unsolicited advertisement packets on the internal network.

In one or more embodiments, a multicast or unicast advertisement packet may be transmitted to an endpoint system in response to a determination that the endpoint system has recently connected to the internal network (in other words, a new device has appeared downstream from the controller). Such multicast or unicast advertisement packets may be sent out without the controller first receiving a solicitation packet.

Figure 5:
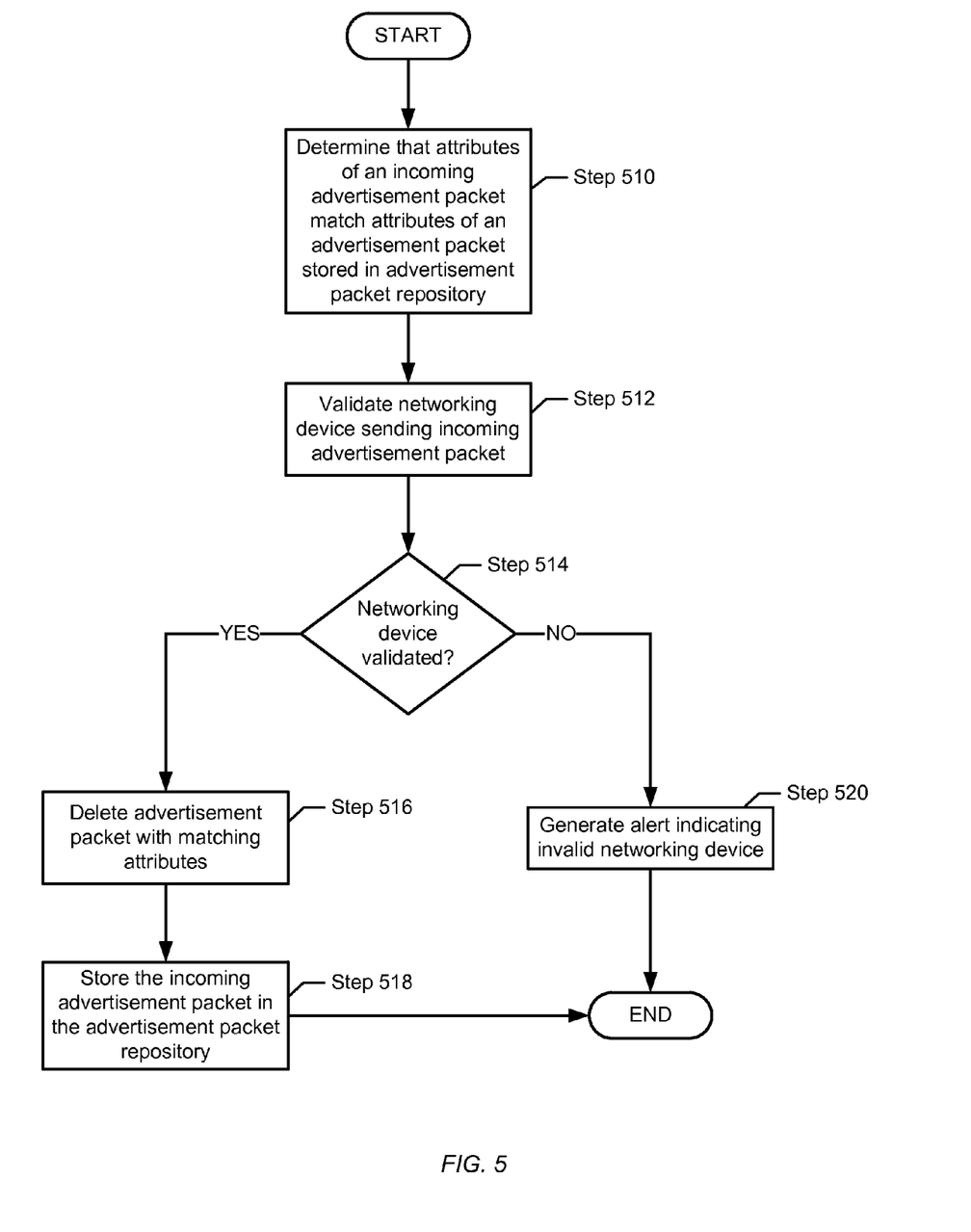
FIG. 5 shows a flow diagram in accordance with one or more embodiments.

FIG. 5 shows a flowchart for validating an advertisement packet in accordance with one or more embodiments. While the various steps in the flowchart are presented and described sequentially, one of ordinary skill will appreciate that some or all of the steps may be executed in different orders, may be combined or omitted, and some or all of the steps may be executed in parallel. The steps of FIG. 5 may correspond to the process of Step 222 in FIG. 2.

In Step 510, the controller determines that attributes of an incoming advertisement packet matches an advertisement packet stored in advertisement packet repository. In Step 512, the controller validates the networking device that sent the incoming advertisement packet. In one or more embodiments, validating the networking device includes determining whether the advertisement packets sent by a networking device describe the networking device sending the advertisement packets. For example, an advertisement packet may indicate a source IP address belonging to an authentic router on the network. The controller may access information about the authentic router (for example, from previously received router advertisement packets) and information available about the device sending the advertisement packet (for example, a link address such as a media access control address) to determine whether the advertisement packet is validly issued. For example, the controller may receive a router advertisement packet that has a source IP address matching the source IP address of a previously received router advertisement packet, but also has a media access control address that differs from the media access control address of the previously received router advertisement packet. The controller may then determine that the device located at the new media access control address is attempting to attack the network and is invalid. Other indications of invalidity arise if a controller detects that the advertisement packet has been spoofed or that the attributes of the advertisement packet have been altered to divert traffic to the source address of the advertisement packet for the purposes of causing a denial-of-service attack.

In Step 514, the controller determines whether the networking device is validated. If in Step 514, the controller determines that the networking device is validated, then in Step 516, the controller deletes the advertisement packet(s) in the advertisement packet repository with matching attributes. In one or more embodiments, if the controller determines that the networking device is validated, the controller assumes that the networking device(s) that sent the previously stored advertisement packet with matching attributes has been removed or replaced by the networking device that has been validated. In Step 518, the controller stores the incoming advertisement packet in the advertisement packet repository.

If in Step 514, the controller determines that the networking device is not validated, then in Step 520, the controller generates an alert indicated that the networking device that sent the incoming advertisement packet is invalid. In one or more embodiments, Step 520 may include warning other devices attached to the network that the invalid networking device is attempting to corrupt the network. In one or more embodiments, the alert is sent to a system administrator.

Figure 6A:
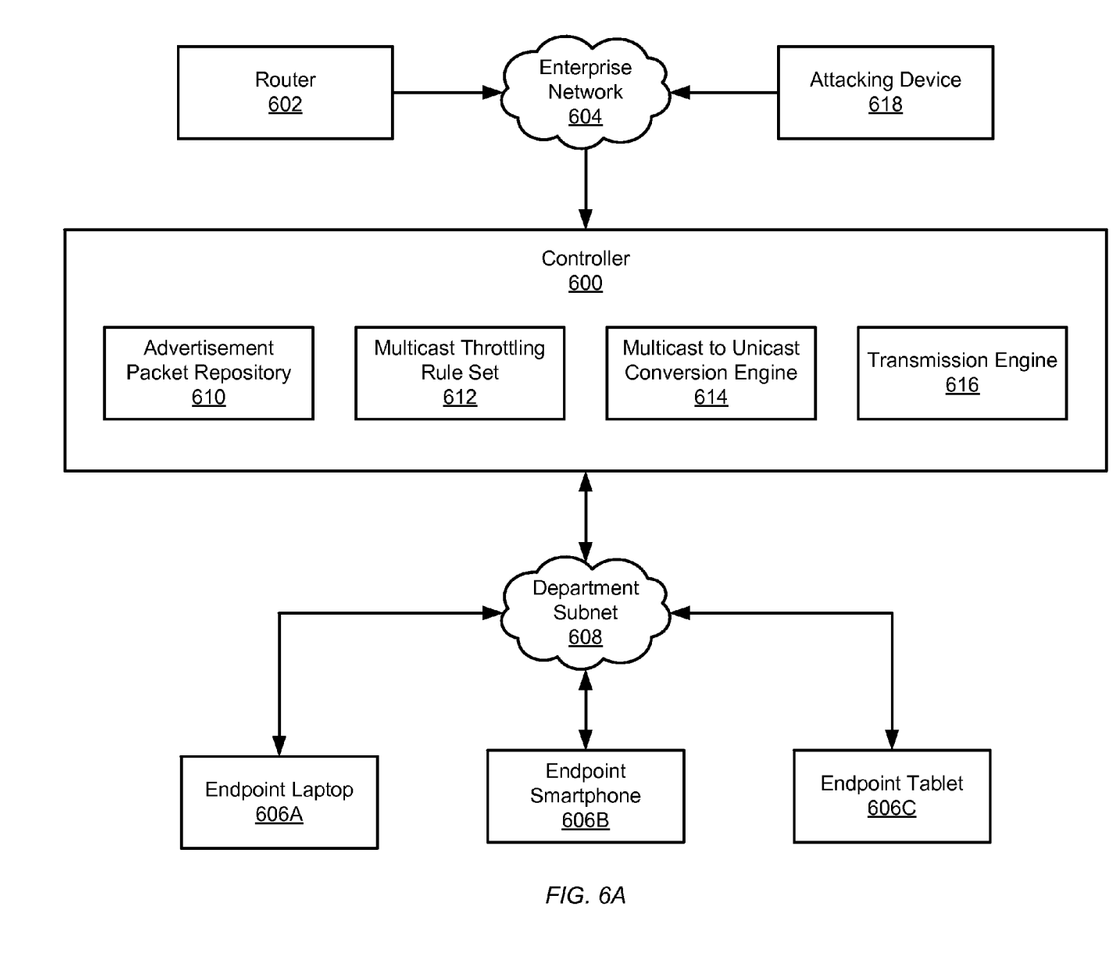
FIGS. 6A-6C show an example in accordance with one or more embodiments.
Figure 6B:
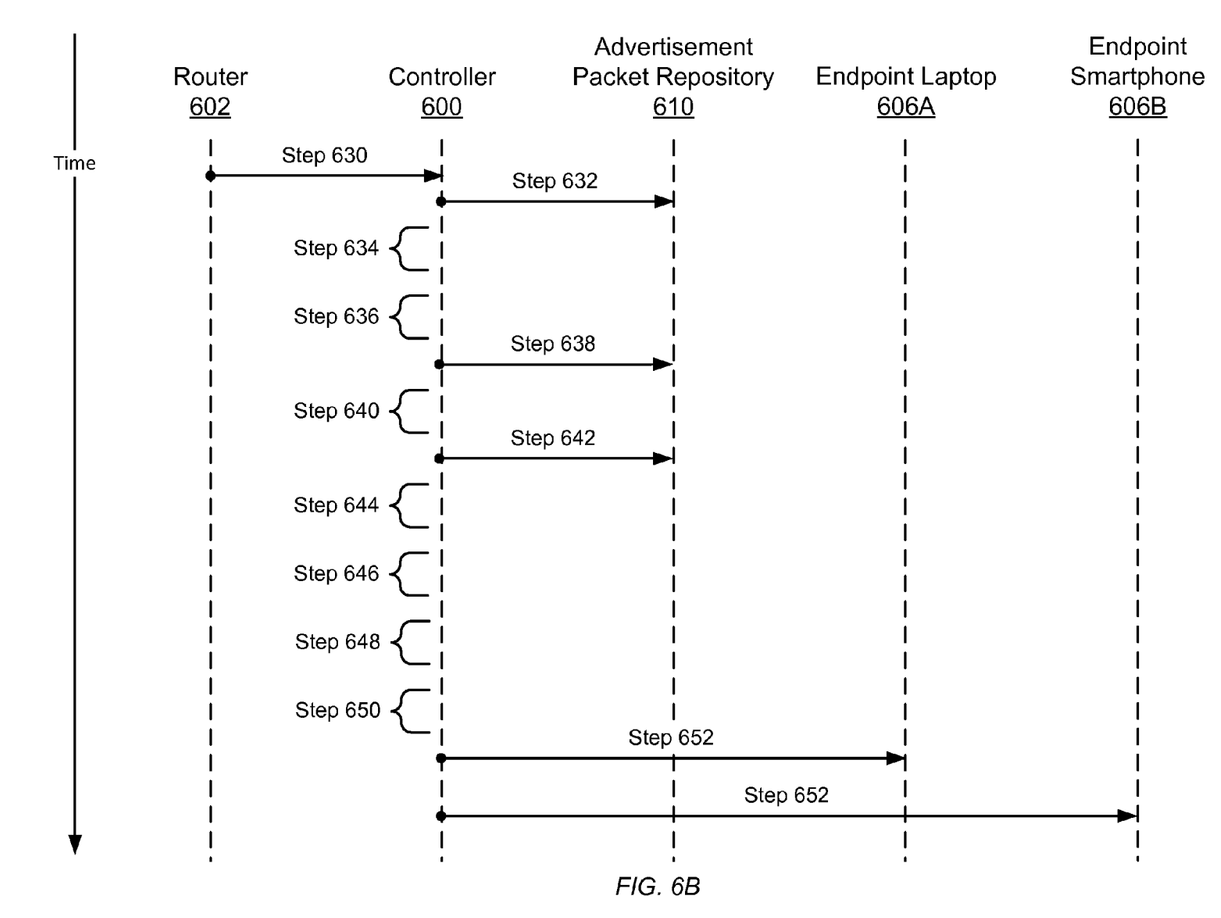
Figure 6C:
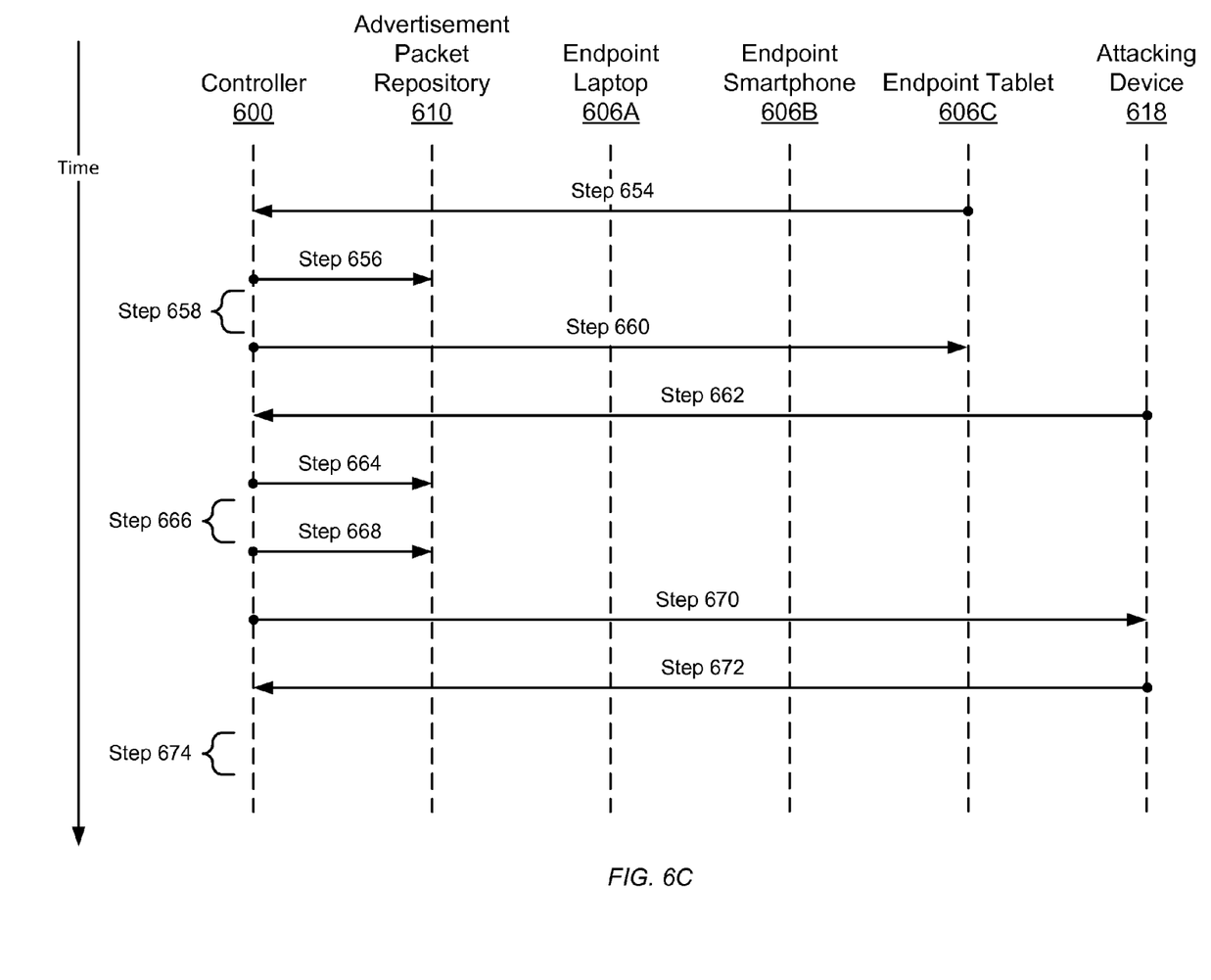

FIGS. 6A, 6B, and 6C show an example in accordance with one or more embodiments. FIG. 6A shows an example system in accordance with one or more embodiments. As shown in FIG. 6A, the example system includes a controller (600) operatively connected to a router (602) and an attacking device (618) via an enterprise network (604). The controller (600) is also connected to number of endpoint systems (endpoint laptop (606A), endpoint smartphone (606B), and endpoint tablet (606C)) via a department subnet (608). The controller (600) includes an advertisement packet repository (610), a multicast throttling rule set (612), a multicast to unicast conversion engine (614), and a transmission engine (616).

For the purposes of the example, assume that the multicast throttling rule set (612) includes a retransmission frequency policy dictating that advertisement packets are to be retransmitted at one tenth the frequency that they are received.

Assume further that the multicast throttling rule set (612) also includes an advertisement packet aggregate traffic level policy dictating that the advertisement packet aggregate traffic level not exceed 1% of the internal network traffic level.

FIG. 6B shows a timeline in accordance with one or more embodiments. Step 630 through Step 638 show an example of the process described in FIG. 2. In Step 630, the controller (600) receives an incoming RA packet from the router (602). In Step 632, the controller (600) compares the incoming RA packet to the advertisement packets stored in the advertisement packet repository (610). Assume that the advertisement packet repository (610) is empty prior to Step 632. In Step 634, the controller (600) determines that a copy of the incoming RA packet does not exist in the advertisement packet repository (610). In Step 636, the controller compares the attributes of the incoming RA packet to the attributes of advertisement packets stored in advertisement packet repository (610) and determines the attributes of the incoming RA packet do not match the attributes of any other advertisement packet stored in the advertisement packet repository (610). In Step 638, the controller (600) stores the incoming RA packet in the advertisement packet repository (610).

Step 640 through Step 650 show an example of the process described in FIG. 3. In Step 640, the controller (600) determines that a new advertisement packet has been stored in the advertisement packet repository (610). In Step 642, the controller (600) obtains the attributes for the new RA packet, including the source IP address (FE80::0202:B3FF:FE1E:8329), the destination address (ff02::1), and type of issuing device (router). Assume that subsequent RA packets have been received by the controller (600) from the router (602), and that the controller (600) has recorded a reception period of 10 seconds (in other words, the router (602) sends out an RA packet once every 10 seconds).

In Step 644, the controller (600) obtains the current internal network traffic level. Assume that the current internal network traffic level is 100 megabits per second. In Step 646, the controller (600) obtains the current advertisement packet aggregate traffic level. Assume that the current advertisement packet aggregate traffic level is 10 kilobits per second. In Step 648, the controller (600) calculates the frequency for transmitting the new RA packet over the department subnet (608) as one tenth of 10 seconds (100 seconds). Also at Step 648, the controller determines that, with the additional transmission of the new RA packet, the new advertisement packet aggregate traffic level would increase to 11 kilobytes per second. In Step 650, the controller (600) determines that scheduling the new RA packet for transmission on department subnet (608) is consistent with the multicast throttling rule set (in other words, the new advertisement packet aggregate traffic level does not exceed 1% of the internal network traffic level). In Step 652, the RA packet is retransmitted to endpoint laptop (606A) and endpoint smartphone (606B). Assume that endpoint tablet (606C) has not yet joined the department subnet at Step 652.

FIG. 6C shows a timeline in accordance with one or more embodiments. Step 654 through Step 660 show an example of the process described in FIG. 4. Assume that endpoint tablet (606C) attached to the network after the most recent RA packet for the router (602) was retransmitted by the controller (600). In Step 654, the controller (600) receives a RS packet from endpoint tablet (606C). In Step 656, the controller (600) compares the RS packet to the RA packet stored in the advertisement packet repository (610) and determines that the RA packet satisfies the RS packet. In Step 658, the controller (600) converts the RA packet into unicast RA packet. In Step 660, the controller (600) sends the unicast RA packet to the endpoint tablet (606C).

Step 662 through Step 674 show an example of the process described in FIG. 2 and FIG. 5. In Step 662, the controller (600) receives an incoming RA packet from the attacking device (618) with a source IP address of FE80::0202:B3FF:FE1E:8329 and a gateway address matching the address of the attacking device. In Step 664, the controller (600) compares the incoming RA packet to the advertisement packets stored in the advertisement packet repository (610). In Step 666, the controller (600) determines that a copy of the incoming RA packet does not exist in the advertisement packet repository (610) (for example, the newly received advertisement packet includes at least one attribute that differs from the attributes of the advertisement packets stored in the advertisement packet repository (610)). In Step 668, the controller compares the attributes of the incoming RA packet to the attributes of advertisement packets stored in advertisement packet repository (610) and determines the source address (FE80::0202:B3FF:FE1E:8329) of the incoming RA packet from the attacking device matches the source address (FE80::0202:B3FF:FE1E:8329) of the RA received from the router (602), but the gateway address of the incoming RA packet from the attacking device does not match the source address of the RA received from the router (602) (indicating a potential attempt to disrupt network traffic).

In Step 670, the controller (600) attempts to validate the attacking device (618) by sending a message to the gateway address of the newly received advertisement packet requesting the IP address of the device. In Step 672, the controller (600) receives the attacking device's (618) IP address (FE80::0202:B3FF:FE1E:9851) from the attacking device (618). In Step 674, the controller (600) determines that the IP address of the RA from the attacking device (618) does not match the IP address of the attacking device (618) and sends an alert to a system administration system.

Figure 7:
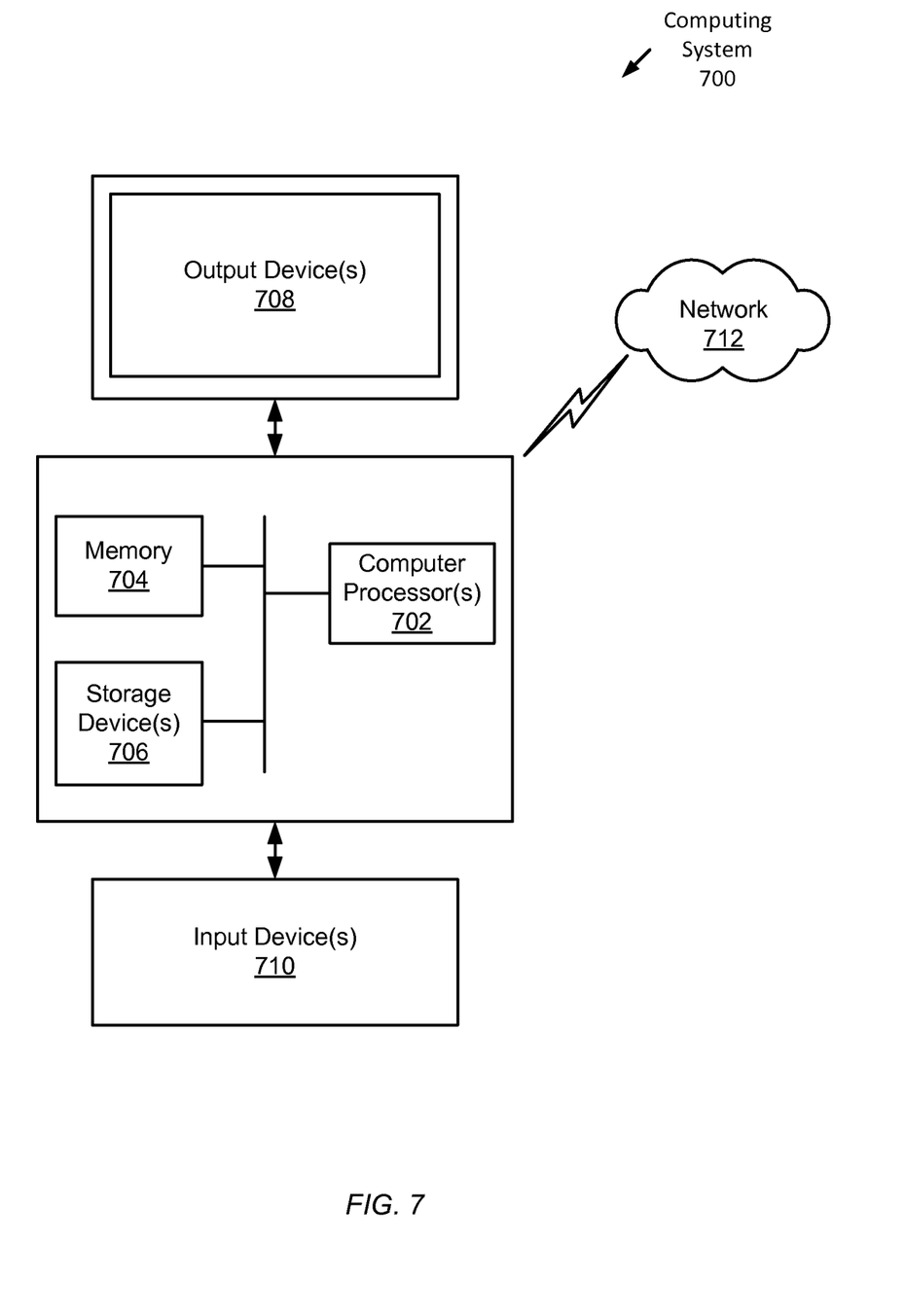
FIG. 7 shows a computer system in accordance with one or more embodiments.

Embodiments may be implemented on virtually any type of computing system regardless of the platform being used. For example, the computing system may be one or more mobile devices (for example, laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 7, the computing system (700) may include one or more computer processor(s) (702), associated memory (704) (for example, random access memory (RAM), cache memory, flash memory, etc.), one or more storage device(s) (706) (for example, a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (for example, a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (for example, a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system (700) may be located at a remote location and connected to the other elements over a network (712). Further, embodiments may be implemented on a distributed system having a plurality of nodes, where each portion of embodiments may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While embodiments have been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A non-transitory computer readable medium comprising instructions that, when executed by a processor, cause a controller to:
   receive a first plurality of multicast advertisement packets from a first networking device on an external network, wherein the plurality of multicast advertisement packets are received at a first frequency;
   store a first multicast advertisement packet of the first plurality of multicast advertisement packets in an advertisement packet repository in response to a determination that the advertisement packet repository does not comprise a copy of the first multicast advertisement packet and in response to a determination that an attribute of the first multicast advertisement packet does not match an attribute of another multicast advertisement packet in the advertisement packet repository;
   transmit the first advertisement packet on an internal network at a second frequency, wherein the second frequency is less frequent than the first frequency; and
   determine a frequency at which to multicast the first multicast advertisement packet to the internal network based on an attribute of the first multicast advertisement packet, a current internal traffic level of the internal network, and a current aggregate traffic level of advertisement packets in the internal network.

2. The non-transitory computer readable medium of claim 1, the instructions further cause the controller to:
   receive a second multicast advertisement packet from a second networking device on the external network;

determine whether an attribute of the second multicast advertisement packet matches the attribute of the first multicast advertisement packet of the first plurality of multicast advertisement packets stored in the advertisement packet repository;

in response to a determination that the attribute of the second multicast advertisement packet does not match the attribute of the first multicast advertisement packet, store the second multicast advertisement packet in the advertisement packet repository; and in response to a determination that the attribute of the second multicast advertisement packet matches the attribute of the first multicast advertisement packet, validate the second networking device.

3. The non-transitory computer readable medium of claim 2, wherein to validate the second networking device, the controller is to:

send a message to a gateway address of the second multicast advertisement packet requesting an Internet Protocol (IP) address of the second network device;

receive the IP address from the second network device; and send an alert indicating that the second networking device is invalid in response to a determination that the IP address from the second networking device does not match the IP address in the second multicast advertisement packet.

4. The non-transitory computer readable medium of claim 1, wherein to transmit the first advertisement packet on the internal network at the second frequency, the instructions are to cause the controller to:

determine the second frequency based on a multicast throttling rule set.

5. A system comprising:

an advertisement packet repository;

a controller communicatively coupled to an external network and an internal network to:

receive a first plurality of multicast advertisement packets from a first networking device on the external network, wherein the plurality of multicast advertisement packets are received at a first frequency, store a first multicast advertisement packet of the first plurality of multicast advertisement packets in the advertisement packet repository in response to a determination that the advertisement packet repository does not include a copy of the first multicast advertisement packet and in response to a determination that an attribute of the first multicast advertisement packet does not match an attribute of another multicast advertisement packet in the advertisement packet repository;

determine a frequency at which to multicast the first multicast advertisement packet to the internal network based on an attribute of the first multicast advertisement packet, a current internal traffic level of the internal network, and a current aggregate traffic level of advertisement packets in the internal network; and a transmission engine to:

transmit the first multicast advertisement packet on the internal network at a second frequency, wherein the second frequency is less frequent than the first frequency.

6. The system of claim 5, wherein the controller is further to:

receive a second multicast advertisement packet from a second networking device on the external network;

determine whether an attribute of the second multicast advertisement packet matches the attribute of the first multicast advertisement packet stored in the advertisement packet repository;

in response to a determination that the attribute of the second multicast advertisement packet does not match the attribute of the first multicast advertisement packet, store the second multicast advertisement packet in the advertisement packet repository; and in response to a determination that the attribute of the second multicast advertisement packet matches the attribute of the first multicast advertisement packet, validate the second networking device.

7. The system of claim 6, wherein to validate the second networking device, the controller is to:

send a message to a gateway address of the second multicast advertisement packet requesting an Internet Protocol (IP) address of the second network device;

receive the IP address from the second network device; and sending an alert indicating that the second networking device is invalid in response to a determination that the IP address received from the second networking device does not match the IP address in the second multicast advertisement packet.

8. The system of claim 5, wherein to transmit the one of the plurality of advertisement packets on the internal network at the second frequency, the controller is to:

determine the second frequency based on a multicast throttling rule set.

9. A non-transitory computer readable medium comprising instructions that, when executed by a processor, cause a controller to:

receive a plurality of multicast advertisement packets from a networking device on an external network;

store a first multicast advertisement packet of the plurality of multicast advertisement packets in an advertisement packet repository;

determine a frequency at which to issue the first multicast advertisement packet to an internal network based on an attribute of the first multicast advertisement packet, a current internal traffic level of the internal network, and a current aggregate traffic level of advertisement packets in the internal network;

convert the first multicast advertisement packet into a unicast advertisement packet; and transmit the unicast advertisement packet to an endpoint system on the internal network.

10. The non-transitory computer readable medium of claim 9, wherein the controller is to convert the first multicast advertisement packet into a unicast advertisement packet and send the unicast advertisement packet to an endpoint system in response to receiving, by the controller, a multicast solicitation packet from the endpoint system on the internal network.

11. The non-transitory computer readable medium of claim 9, wherein the controller is to convert the first multicast advertisement packet into a unicast advertisement packet and send the unicast advertisement packet to an endpoint system in response to determining, by the controller, that the endpoint system has recently connected to the internal network.

12. The non-transitory computer readable medium of claim 9, wherein the first multicast advertisement packet is a multicast router advertisement packet comprising a set of internet protocol address ranges reachable via the networking device.

13. The non-transitory computer readable medium of claim 9, wherein the controller refrains from transmitting the first multicast advertisement packet on the internal network.

14. A system comprising:

an advertisement packet repository;

a controller communicatively coupled to an external network and an internal network to:

receive a plurality of multicast advertisement packets from a networking device on the external network, store a first multicast advertisement packet of the plurality of multicast advertisement packets in the advertisement packet repository, determine a frequency at which to issue the first multicast advertisement packet to an internal network based on an attribute of the first multicast advertisement packet, a current internal traffic level of the internal network, and a current aggregate traffic level of advertisement packets in the internal network, and convert the first multicast advertisement packet into a unicast advertisement packet; and a transmission engine to:

transmit the unicast advertisement packet to an endpoint system on the internal network.

15. The system of claim 14, wherein the controller is to convert the first multicast advertisement packet into a unicast advertisement packet in response to receiving a multicast solicitation packet from the endpoint system on the internal network.

16. The system of claim 14, wherein the controller is configured to convert the first multicast advertisement packet into a unicast advertisement packet in response to determining that the endpoint system has recently connected to the internal network.

17. The system of claim 14, wherein the first multicast advertisement packet is a multicast router advertisement packet comprising a set of internet protocol address ranges reachable via the networking device.

18. The system of claim 14, wherein the controller is further to: refrain from transmitting the first multicast advertisement packet on the internal network.

* * * * *